United States Patent
Beringer et al.

(10) Patent No.: US 8,129,036 B2
(45) Date of Patent: Mar. 6, 2012

(54) HIGH STRENGTH AND HIGH THERMAL CONDUCTIVITY HEAT TRANSFER APPARATUS

(75) Inventors: Durwood M. Beringer, Suffield, CT (US); Kenneth J. Zacharias, Windsor, CT (US); Jesse J. Stieber, Waterbury, CT (US); Edmund P. Taddey, West Springfield, MA (US); Stephen A. Yaworski, Tolland, CT (US); Gregory K. Schwalm, Canton, CT (US)

(73) Assignee: Hamilton Sundstrand Space Systems International, Inc., Windsor Locks, CT (US)

( * ) Notice: Subject to any disclaimer, the term of this patent is extended or adjusted under 35 U.S.C. 154(b) by 823 days.

(21) Appl. No.: 12/119,543

(22) Filed: May 13, 2008

(65) Prior Publication Data

US 2009/0283250 A1   Nov. 19, 2009

(51) Int. Cl.
*B32B 15/20* (2006.01)
*B32B 15/18* (2006.01)
*F28F 21/08* (2006.01)

(52) U.S. Cl. ........ 428/627; 428/674; 428/677; 428/685; 428/661; 428/472; 165/905

(58) Field of Classification Search .................. None
See application file for complete search history.

(56) References Cited

U.S. PATENT DOCUMENTS

| | | | |
|---|---|---|---|
| 2,807,074 A | 9/1957 | Schroeder | |
| 3,053,511 A | 9/1962 | Godfrey | |
| 3,886,647 A * | 6/1975 | Alexander | 228/175 |
| 4,314,007 A * | 2/1982 | Gessinger | 428/614 |
| 4,525,433 A * | 6/1985 | Heywood | 428/670 |
| 5,001,299 A * | 3/1991 | Hingorany | 174/521 |
| 5,063,117 A | 11/1991 | Suda | |
| 5,308,311 A * | 5/1994 | Eggers et al. | 600/28 |
| 5,564,496 A | 10/1996 | Blum | |
| 5,895,696 A * | 4/1999 | Stanish et al. | 428/64.1 |
| 6,176,418 B1 * | 1/2001 | Iwadachi | 228/193 |
| 6,277,499 B1 * | 8/2001 | Beers et al. | 428/548 |
| 7,293,602 B2 | 11/2007 | Nadig | |
| 2002/0006526 A1 * | 1/2002 | Polese et al. | 428/654 |
| 2002/0168542 A1 * | 11/2002 | Izbicki et al. | 428/659 |
| 2004/0018314 A1 | 1/2004 | Otter | |
| 2004/0250422 A1 | 12/2004 | Ali | |
| 2005/0106056 A1 * | 5/2005 | Peng et al. | 419/8 |
| 2009/0004499 A1 * | 1/2009 | Vatchiants | 428/550 |
| 2009/0104470 A1 * | 4/2009 | Suzuki et al. | 428/570 |
| 2009/0112200 A1 * | 4/2009 | Eggers | 606/29 |

FOREIGN PATENT DOCUMENTS

| | | | |
|---|---|---|---|
| GB | 779769 | | 7/1957 |
| JP | 63-76774 | * | 4/1988 |
| JP | 64-22481 | * | 1/1989 |
| JP | 2-84324 | * | 3/1990 |
| WO | 9725577 | | 7/1997 |

\* cited by examiner

*Primary Examiner* — John J Zimmerman
(74) *Attorney, Agent, or Firm* — Carlson Gaskey & Olds, P.C.

(57) ABSTRACT

A heat transfer apparatus includes a first protective layer of a first metallic material, a second protective layer of a second metallic material, and a heat transfer layer bonded between the first protective layer and the second protective layer. The heat transfer layer is made of a metal matrix composite, such as aluminum oxide reinforcement dispersed within a copper matrix.

7 Claims, 1 Drawing Sheet

US 8,129,036 B2

HIGH STRENGTH AND HIGH THERMAL CONDUCTIVITY HEAT TRANSFER APPARATUS

This invention was made with government support under Contract No. Contract No. NAS 2-03146 awarded by the National Aeronautics and Space Administration. The Government may therefore have certain rights in this invention.

BACKGROUND OF THE INVENTION

This disclosure relates to heat transfer devices and, more particularly, to a heat transfer device having high strength, high thermal conductivity, and high temperature resistance.

Heat transfer devices, such as heat exchangers, may operate at relatively high temperatures while in contact with corrosive fluids. For example, the components of the heat transfer device may be formed from an age-hardened copper alloy that generally provides a desired degree of strength and corrosion resistance up to a threshold temperature of about 600° F.-800° F. (316° C.-427° C.). Above the threshold temperature range, precipitants that contribute to the strength may coarsen and subsequently diminish the strength and/or resistance to corrosion.

Although copper alloys are effective in many heat transfer devices, there may be a desire in some applications for even greater strength and thermal conductivity at higher temperature conditions. Replacement alloys having higher temperature resistance, strength, and corrosion resistance have been considered, but such alloys have lower thermal conductivity than copper and do not meet desired performance demands. Other potential replacement alloys having higher thermal conductivity do not have the desired degree of strength and corrosion resistance. Therefore, there is a need for a thermal transfer device having enhanced strength, corrosion resistance, and temperature resistance characteristics.

SUMMARY OF THE INVENTION

The disclosed examples and variations of heat transfer devices are intended to provide a desirable combination of high strength, high thermal conductivity, and high temperature resistance that has not been available with prior arrangements.

For example, one heat transfer apparatus includes a first protective layer of a first metallic material, a second protective layer of a second metallic material, and a heat transfer layer bonded between the first protective layer and the second protective layer. The heat transfer layer is made of a metal matrix composite that provides relatively high strength and thermal conductivity, while the first and second protective layers provide relatively high corrosion resistance.

In some examples, the first and second protective layers are made of stainless steel and the metal matrix composite includes aluminum oxide reinforcement dispersed within a copper matrix. Additionally, a diffusion barrier layer may be included between each of the protective layers and the heat transfer layer to control diffusion. The diffusion barrier layers may be made of a refractory material.

The disclosed heat transfer apparatus may be manufactured using any of a variety of different processing methods that include bonding the first protective layer of the first metallic material and the second protective material of the second metallic material to the heat transfer layer.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION OF THE PREFERRED EMBODIMENT

Figure 1:
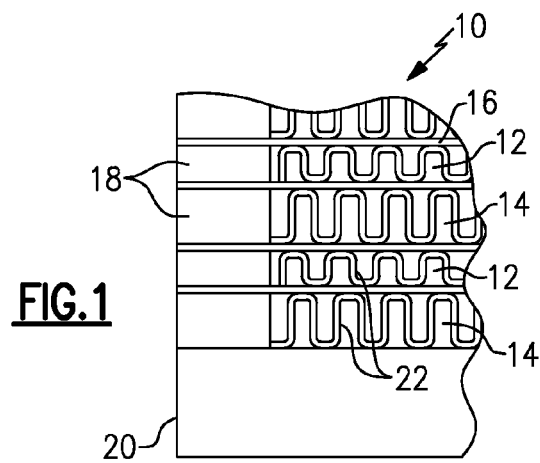
FIG. 1 illustrates a portion of a heat transfer device.

FIG. 1 illustrates a portion of an example heat transfer apparatus or device 10. It is to be understood that although a particular type and design of the heat transfer device 10 is shown in this example, the examples herein may also be applied to other types of heat transfer devices and designs. In this example, the heat transfer device 10 includes alternating flow channels 12 and 14 that are separated by parting sheets 16. The flow channels 12 and 14 are bound on each end by closure bars 18 and on the sides by end sheets 20. Fins 22 extend within each of the flow channels 12 and 14 to facilitate heat transfer. For instance, the flow channels 12 and 14 convey different working fluids (e.g., coolant, oil, air, etc.), and the fins 22 facilitate heat transfer between the working fluids to selectively heat or cool one of the working fluids.

As can be appreciated, one or both of the working fluids may be corrosive and operate at a temperature of approximately 1000° F.-1500° F. (538° C.-816° C.). In this regard, the fins 22 have the characteristics of high strength, high thermal conductivity, and high temperature resistance to provide an overall benefit in the heat transfer device 10 of greater heat exchanging capacity or lower weight/volume for a given heat exchanging capacity.

Figure 2:
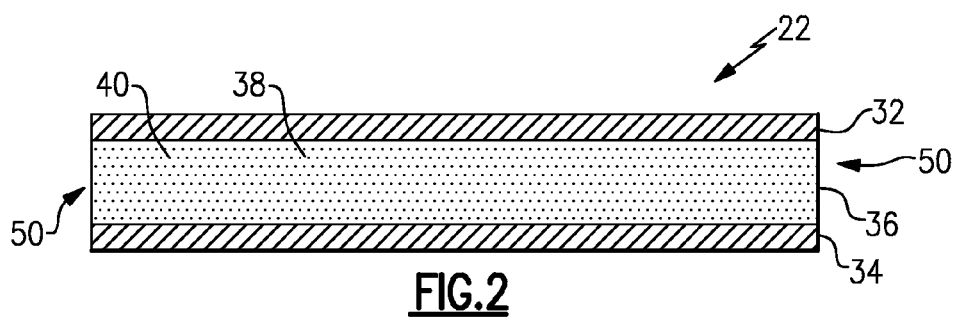
FIG. 2 illustrates a cross-section of a fin used in the heat transfer device.

FIG. 2 illustrates a cross-section through one of the fins 22. In this example, the fin 22 includes a first protective layer 32, a second protective layer 34, and a heat transfer layer 36 bonded between the first protective layer 32 and the second protective layer 34. Thus, the fin 22 is a composite wherein the first protective layer 32 and the second protective layer 34 provide a desired degree of corrosion resistance to the working fluid and/or high temperature environment, and the heat transfer layer 36 provides a desirable degree of thermal conductivity for enhanced heat exchange between the working fluids.

The first protective layer 32 and the second protective layer 34 may be comprised of metallic materials having a desired degree of corrosion and temperature resistance. For example, the first protective layer 32 and the second protective layer 34 may be formed from any metallic material this is known to be more corrosion resistant than the heat transfer layer 36. In one example, the first protective layer 32 and the second protective layer 34 are stainless steel (e.g., steel having grater than about 11.5 wt % of chromium).

The first protective layer 32, the second protective layer 34, and the heat transfer layer 36 may be of any desired thickness, depending for instance on the particular design of the heat transfer device 10, degree of desired corrosion protection, degree of desired thermal conductivity, degree of desired strength, or other design factors. In some examples, each of the first protective layer 32, the second protective layer 34, and the heat transfer layer 36 is about 1 mil-15 mils thick (25.4-381 micrometers). In a further example, the heat transfer layer 36 is thicker than each of the first protective layer 32 and the second protective layer 34 by a factor of about three. In a further example, the heat transfer layer 36 is about 15 mils thick and each of the first protective layer 32 and the second protective layer 34 is about 5 mils (127 micrometers) thick. The term "about" as used in this description relative to thicknesses, compositions, or other values refers to possible variation in the given value, such as normally accepted variations or tolerances in the art.

The heat transfer layer 36 may be formed from any type of material having a desired level of thermal conductivity. For instance, the heat transfer layer 36 may have a thermal conductivity that is higher than the thermal conductivity of the first protective layer 32 and the second protective layer 34. Thus, the first protective layer 32 and the second protective layer 34 protect the less corrosion resistant heat transfer layer 36, and the more thermally conductive heat transfer layer 36 bears a greater degree of the thermal transfer function of the fin 22 than the first protective layer 32 and the second protective layer 34.

In one example, the heat transfer layer 36 is comprised of a metal matrix composite. The metal matrix composite may include aluminum oxide reinforcement 38 dispersed within a copper matrix 40, although other types of metal matrix composites may alternatively be used. The aluminum oxide reinforcement 38 reinforces the copper matrix 40 to provide a relatively high strength compared to pure copper. The copper matrix 40 provides the benefit of relatively high thermal conductivity relative to a pure copper.

The copper matrix 40 may be any of a variety of different compositions. For instance, the copper matrix 40 may be substantially pure copper that may include trace impurities that do not materially affect the properties of the copper or elements that are unmeasured or undetectable in the copper.

The metal matrix composite 36 provides resistance to temperatures of 1000° F. (538° C.) and possibly up to 1500° F. (816° C.). For instance, common copper alloys, or precipitation strengthened copper alloys are limited to use below 600° F.-800° F. (316° C.-427° C.) since the age hardening temperature is typically in this range. However, the aluminum oxide reinforcement 38 is not a product of precipitation hardening, and therefore is not subject to the same solution/precipitation mechanisms that form a precipitation strengthened alloy. Thus, the aluminum oxide reinforcement 38 is inert at the age-hardening temperatures and the metal matrix composite 36 is thereby able to withstand temperatures of 1000° F. (538° C.) and possibly up to 1500° F. (816° C.).

The composition of the metal matrix composite 36 relative to the amount of aluminum oxide reinforcement 38 may vary depending upon the desired properties of the metal matrix composite 36. For instance, the metal matrix composite 36 may include up to about 2.0 wt % of the aluminum oxide reinforcement 38. In a further example, the metal matrix composite includes about 0.3 wt % to 1.5 wt % of the aluminum oxide reinforcement 38. Generally, selecting a lower amount of the aluminum oxide reinforcement 38 would provide the metal matrix composite 36 with relatively higher thermal conductivity and relatively lower strength, while selecting a higher amount of the aluminum oxide reinforcement 38 would provide relatively higher strength but relatively lower thermal conductivity.

The structure of the fin 22 may be formed using any of a variety of different processing methods. For instance, the fin 22 may be formed using roll bonding, diffusion bonding, explosion bonding, or other types of bonding/forming methods. For instance, if roll bonding is used, the heat transfer layer 36 may be positioned between the first protective layer 32 and the second protective layer 34 and then fed into a rolling mill. Rollers of the rolling mill compress the first protective layer 32, the second protective layer 34, and the heat transfer layer 36 together under a relatively high pressure. The pressure causes mechanical deformation that physically locks the first protective layer 32, the second protective layer 34, and the heat transfer layer 36 together. Alternatively, the first protective layer 32, the second protective layer 34, and the heat transfer layer 36 may be heated to cause diffusion bonding. In other examples, the first protective layer 32 and the second protective layer 34 may be formed on the heat transfer layer 36 through a coating process, such as explosion bonding or spraying.

Figure 3:
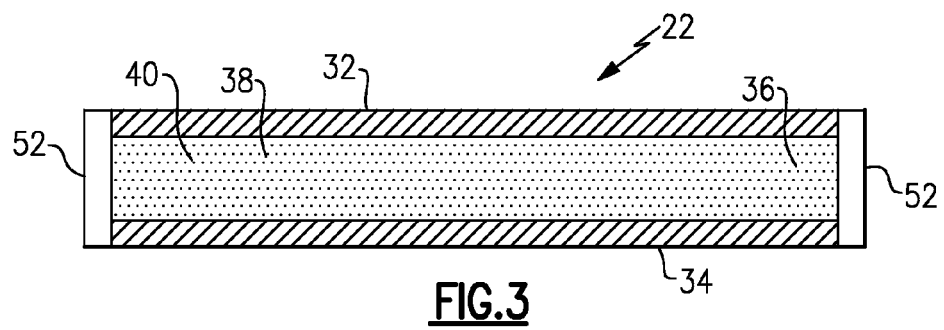
FIG. 3 illustrates the fin with optional cladding on the sides.

As can be appreciated from FIG. 2, edges 50 of the fin 22 may be left exposed to the surrounding environment. However, in some examples, it may be desirable to seal the edges as shown in FIG. 3 with a cladding 52. For instance, the cladding 52 may be a braze alloy that is also used to bond the fins 22 to the parting sheets 16. The braze alloy, such as a copper-based braze alloy, may be forming using known brazing techniques during a brazing process to bond the fins 22 to the parting sheets 16. Alternatively, the cladding 52 may be a nickel-based material for providing additional corrosion resistance to the fin 22. The nickel-based material may be applied using known coating techniques.

Figure 4:
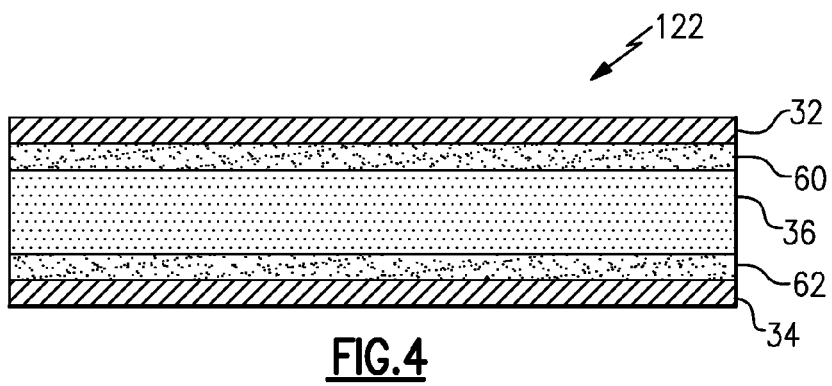
FIG. 4 illustrates another embodiment fin that may be used in the heat transfer device.

FIG. 4 illustrates another embodiment of a heat transfer device 122. In this disclosure like reference numerals designate like elements where appropriate, and reference numerals with the addition of 100 or multiples thereof designate modified elements. The modified elements incorporate the same features and benefits of the corresponding modified elements, except where stated otherwise. In this example, the fin 122 is similar to the fin 22 of the previous examples but includes a first diffusion barrier layer 60 between the first protective layer 32 and the heat transfer layer 36, and a second diffusion barrier layer 62 between the second protective layer 34 and the heat transfer layer 36.

During prolonged operation at relatively high temperatures, the fin 122 may reach temperatures that can cause inter-diffusion among the first protective layer 32, the second protective layer 34, and the heat transfer layer 36. Inter-diffusion may effectively alter the chemical composition of the heat transfer layer 36 and thereby diminish the thermal conductivity of the heat transfer layer 36. In this regard, the first diffusion barrier layer 60 and the second diffusion barrier layer 62 limit inter-diffusion and provide the benefit of maintaining the thermal conductivity of the heat transfer layer 36.

The first diffusion barrier layer 60 and the second diffusion barrier layer 62 may be formed from any type of material suitable for blocking inter-diffusion. The selected material may also have limited diffusivity into the first protective layer 32, the second protective layer 34, and heat transfer layer 36. For instance, the first diffusion barrier layer 60 and the second diffusion barrier layer 62 are generally high melting point materials relative to the materials used for the other layers. In some examples, the first diffusion barrier layer 60 and the second diffusion barrier layer 62 may be formed from a ceramic material or a refractory metal. The ceramic material may include a nitride or a carbonitride, such as titanium nitride or titanium carbonitride. As can be appreciated, other types of ceramic materials may also be used. The refractory metal may include titanium, niobium, tungsten, platinum, rhenium, tantalum, chromium, molybdenum, or combinations thereof.

In some examples, the material for the first diffusion barrier layer 60 and the second diffusion barrier layer 62 may be selected based on the method used to form the fins 122. For instance, one or more of the refractory metals may be selected because of ductility if the fins 122 are formed using roll bonding and subsequently bent into the final desired shape. In a further example, niobium is relatively inexpensive and may exhibit a desirable degree of ductility that avoids cracking when rolled or otherwise mechanically deformed. In fin designs that have high angle bends or no bends any of the refractory metals may be used. Ceramic materials may also be used where ductility is not needed for the forming process, such as in a coating process.

Thus, the disclosed example fins 22 and 122 provide a desirable combination of high strength, high thermal conductivity, and high temperature resistance. For instance, the first protective layer 32 and the second protective layer 34 provide the fin 22 or 122 with excellent corrosion protection, and the heat transfer layer 36 provides the fin 22 or 122 with excellent thermal conductivity.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A heat transfer apparatus comprising:
    a first stainless steel layer;
    a second stainless steel layer;
    a heat transfer layer bonded between the first stainless steel layer and the second stainless steel layer, the heat transfer layer being comprised of a metal matrix composite having an aluminum oxide reinforcement dispersed within a copper matrix;
    a first diffusion barrier layer between the first stainless steel layer and the heat transfer layer; and
    a second diffusion barrier layer between the second stainless steel layer and the heat transfer layer, the first diffusion barrier layer and the second diffusion barrier each being comprised of a refractory material.

2. The heat transfer apparatus as recited in claim 1, wherein the metal matrix composite includes up to about 2.0 wt % of the aluminum oxide reinforcement.

3. The heat transfer apparatus as recited in claim 2, wherein the metal matrix composite includes about 0.3-1.5 wt % of the aluminum oxide reinforcement.

4. The heat transfer apparatus as recited in claim 1, wherein the refractory material is a ceramic material.

5. The heat transfer apparatus as recited in claim 4, wherein the ceramic material includes at least one of a nitride or a carbonitride.

6. The heat transfer apparatus as recited in claim 1, wherein the refractory material is metallic material selected from the group consisting of titanium, niobium, tungsten, platinum, rhenium, tantalum, chromium, molybdenum, and combinations thereof.

7. The heat transfer apparatus as recited in claim 1, wherein the refractory material is niobium.

* * * * *